United States Patent [19]

Shintani et al.

[11] 4,117,517
[45] Sep. 26, 1978

[54] DATA COMPRESSION SYSTEM FOR BINARY FACSIMILE SIGNALS

[75] Inventors: Takamasa Shintani; Koyo Nagasawa, both of Ebina, Japan

[73] Assignee: Fuji Xerox Co., Ltd., Tokyo, Japan

[21] Appl. No.: 771,490

[22] Filed: Feb. 24, 1977

[30] Foreign Application Priority Data

Feb. 27, 1976 [JP] Japan ................................. 51-19951

[51] Int. Cl.² .......................... H04N 1/40; H04N 7/12
[52] U.S. Cl. ...................................... 358/260; 358/261
[58] Field of Search ............................ 358/260, 261; 340/347 DD

[56] References Cited
U.S. PATENT DOCUMENTS 3,801,737  4/1974  Komura ................................ 358/260
3,916,095  10/1975  Weber ................................. 358/261

Primary Examiner—Howard W. Britton
Attorney, Agent, or Firm—Sughrue, Rothwell, Mion, Zinn and Macpeak

[57] ABSTRACT

In a facsimile scanning and transmission system, the black and white binary bit pattern of each scan line is compared with that of the adjacent scan line just above it, and any bit pattern variations are identified as belonging to one of a number of predetermined modes. Each variation or bit difference mode, as well as a no variation mode, is assigned a coded bit pattern or sequence, and only these coded bit patterns are transmitted. Variations not conforming to one of the predetermined modes may be transmitted uncoded, after being preceded by an identification code. The net result is significant data compression with no loss in intelligence. The process is easily reversed at the receiver end to reconstruct the facsimile picture.

5 Claims, 5 Drawing Figures

DATA COMPRESSION SYSTEM FOR BINARY FACSIMILE SIGNALS

BACKGROUND OF THE INVENTION

This invention relates to a data compression technique for binary bit trains derived from the sequential scanning of the adjacent or successive lines of a picture to be coded and transmitted in a facsimile system.

In an uncoded black and white facsimile signal comprising a binary bit train obtained by the constant speed scanning of successive picture lines, the white signal ratio is overwhelmingly predominant in terms of both occurrence and duration, whereby the redundancy rate is very high. Furthermore, there are few changes in the bit patterns between adjacent scanning lines, and the line repetition or redundancy ratio is therefore also quite high. As a result, when a straight black and white facsimile signal is transmitted without coding or modification, as in many of the more simplified prior art devices, the signal redundancy is great which significantly increases the transmission time and cost.

SUMMARY OF THE INVENTION

It is therefore an object of the present invention to provide a new facsimile signal coding system which can effectively reduce the above-mentioned signal redundancy ratios as well as the transmission time and cost.

In accordance with the invention, use is made of the recognition that in adjacent scan lines there is usually very little or no variation in the respective bit patterns, and even in those cases where some variations exist they typically involve only one or two successive bits. Stated another way, the majority of the corresponding bits of adjacent scan lines, i.e. bits occupying the same horizontal positions, are identical over relatively long horizontal runs, and when variations occur they commonly involve only one or two bits at either or both ends of such runs. Furthermore, these variations usually fall into one of several conveniently classifiable and easily recognizable modes. Therefore, and according to the invention, the black and white binary bit pattern of each scan line is compared with that of the adjacent scan line just above it, and any bit pattern variations are identified as belonging to one of a number of predetermined modes. Each variation or bit difference mode, as well as a no variation mode, is assigned a coded bit pattern or sequence, and only these coded bit patterns are transmitted. Variations not conforming to one of the predetermined modes may be transmitted uncode, after being preceded by an identification code. The net result is significant data compression with no loss in intelligence. The process is easily reversed at the receiver end to reconstruct the facsimile picture.

DETAILED DESCRIPTION OF THE PREFERRED EMBODIMENTS

Considering the typical redundancies noted above between a lower scanned line to be coded and an upper scanned line directly above, when the binary bit signal for the lower line is divided into corresponding intervals or increments with the binary signal for the upper line, and is compared therewith at the same level, the patterns shown in FIGS. 1(a) to (h) often result. In each pattern, the upper half represents the binary bit signal for the upper scanning line while the lower half represents that for the lower scanning line to be compressively coded. The shaded portions represent black or "1" bits while the white portions represent white of "0" bits. The bit or scanning increment division lines have been omitted in the continuous bit portions to simplify the drawings. These commonly occuring bit variation patterns may be conveniently classified or broken down as follows:

S mode . . . Same bit pattern in the upper and lower scanning lines — FIGS. 1(a) and (e), and D mode . . . Different bit patterns in the upper and lower scanning lines.

Furthermore, the D mode may be sub-classified as follows:

D-R mode . . . Different by one increment on the right, as shown in FIGS. 1(b) and (f), D-L mode . . . Different by one increment on the left, as shown in FIGS. 1(c) and (g), D-RL mode . . . Different by one increment on the right and left, as shown in FIGS. 1(d) and (h), and D-B mode . . . All other difference patterns.

Therefore, when the bit pattern of the upper scanning line is known, in the case of the S, D-R, D-L, and D-RL modes, only an assigned code representative of the respective mode need be transmitted. For the D-B mode, an identification code may be assigned and then the actual bit pattern of the D-B mode portion may be transmitted directly, or run length coding or the like may be used. In this manner all of the scanning increment information for a given scan line can be assembled and transmitted to achieve substantial bit compression.

In the case of picture signals such as facsimile, the occurence probability of 0 bit changes between adjacent scanning lines is the highest, i.e. S mode, and forms nearly one half of the entire scanning pattern. A difference of just 1 bit on either or both ends (D-R, D-L, D-RL modes) is next highest in occurrence probability, the total of these four modes forming the majority of the scanning pattern. For bit number changes ($n$) or differences of 2 bits, 3 bits, or more, the occurrence probability is much less, and decreases rapidly as $n$ increases. Therefore, various modes of displacement or difference involving from 0 to $n$ bits may suitably be classified and assigned codes in accordance with the distribution of the above-mentioned occurrence probabilities, to thereby achieve a substantial data compression rate.

Figure 1:
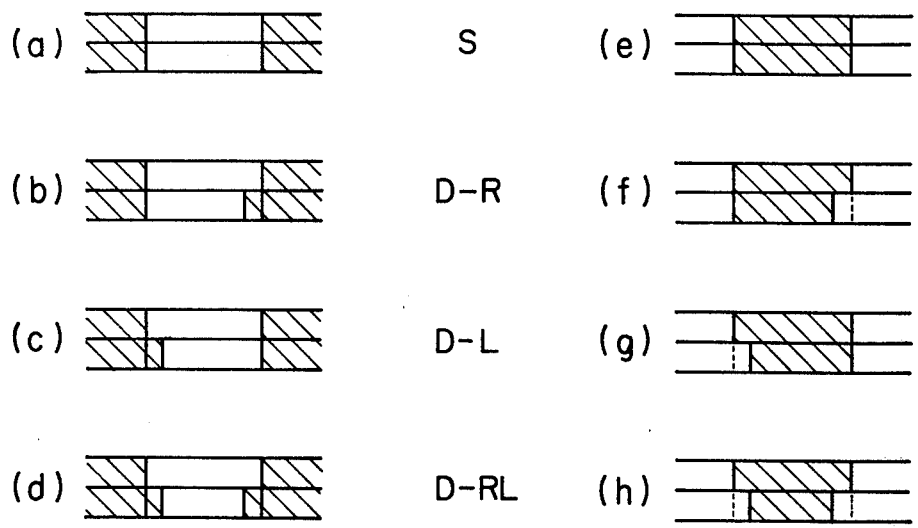
FIGS. 1(a) − 1(h) and 3(a) − 3(r) are views showing different, commonly occurring modes of binary sampling signals on adjacent upper and lower scanning lines, FIGS. 2 and 4 each show one example of coding a binary signal for a lower scanning line according to the modes shown in FIGS. 1 and 3, respectively.
Figure 2:
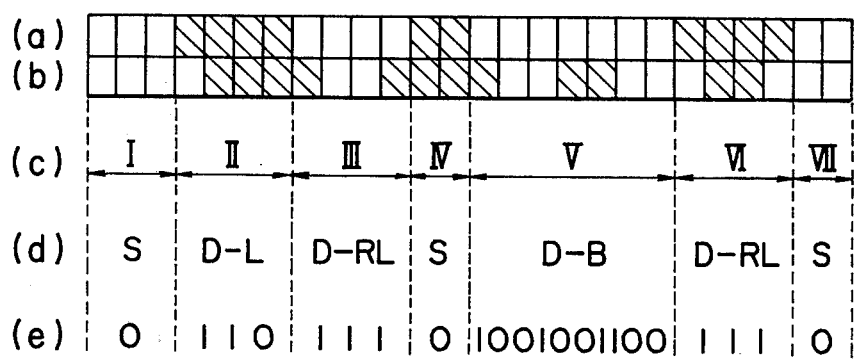

FIG. 2 shows one example in which the lower one of successive or adjacent upper and lower scan lines is coded using the system concept described above. Codes are assigned to each of the modes shown in FIG. 1, and for the D-B mode the actual bit pattern in the D-B mode interval is transmitted without modification, after being preceded by a D-B mode identification code. Assuming that the various modes are assigned codes as shown in Table 1 below, Table 1

| MODE | S | D | | | |
|------|---|---|---|---|---|
|      |   | R | L | RL | B |
| CODE | 0 | 101 | 110 | 111 | 100 | the binary bits of the upper and lower scan lines are as shown in rows (a) and (b), respectively, and the mode division intervals are I to VII as shown in row in (c), then the represented modes shown in row (d), as determined from Table 1, result in a compressively coded transmission signal as shown in row (e). The D-B mode shown is represented by the DB code (100) followed by the actual binary bit pattern.

Figure 3:
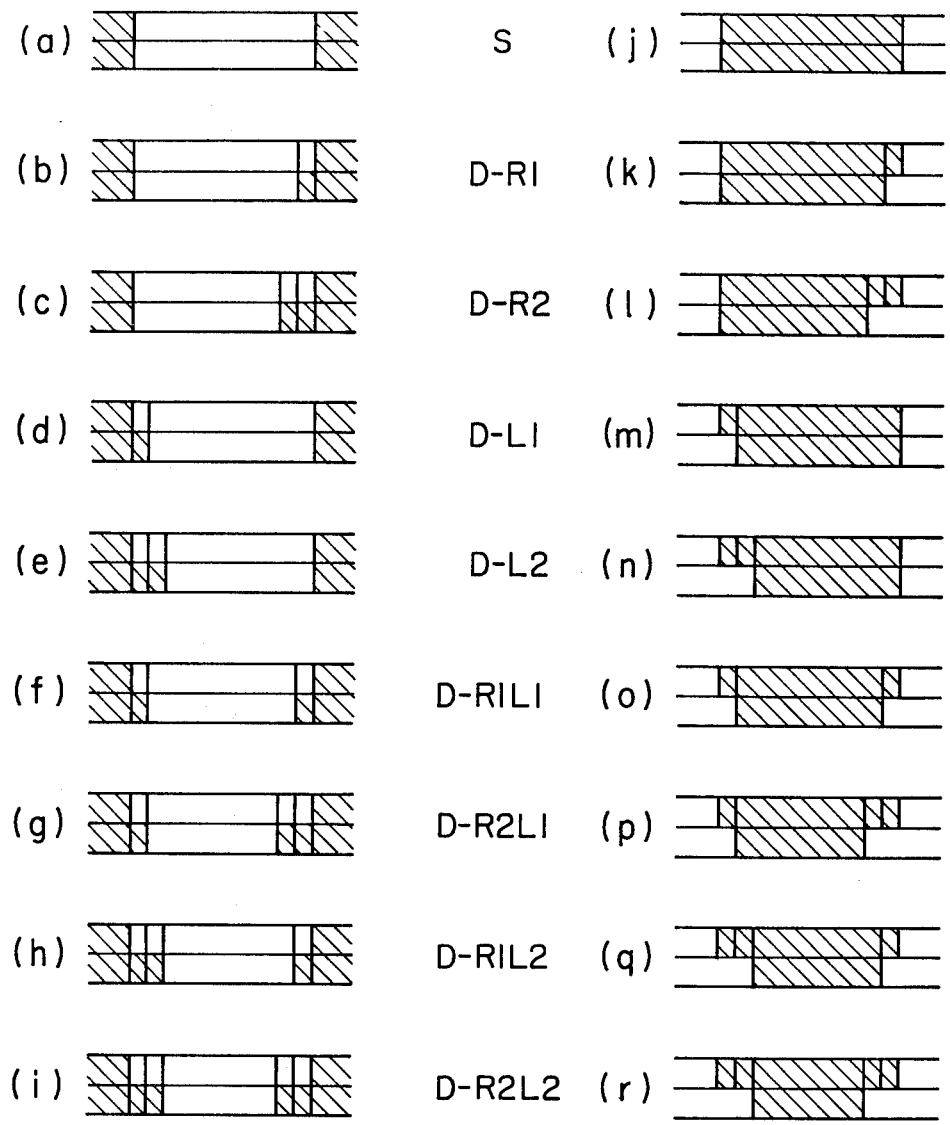
Figure 4:
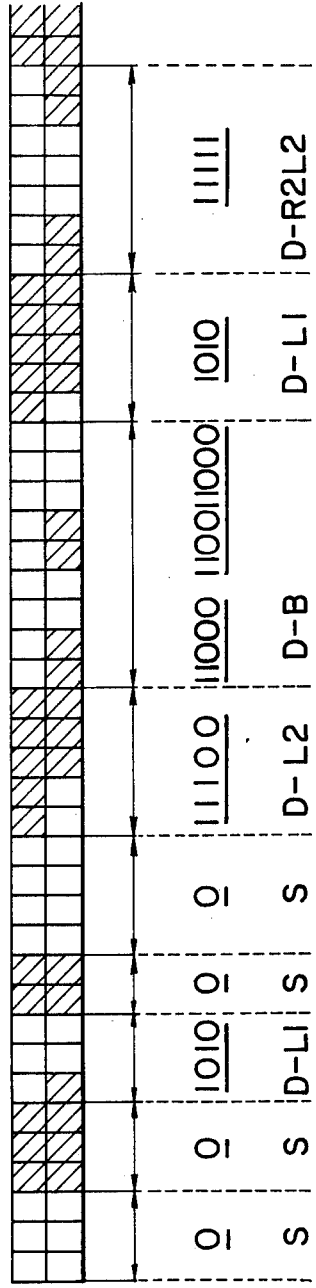

In the example shown in FIG. 3 the difference mode classification has been carried one step farther by identifying particular modes for all successive line bit pattern differences up to and including 2 bits on either or both ends of a mode division interval. FIG. 4 shows one example of a lower scan line coded in accordance with the mode pattern classifications shown in FIG. 3, with the mode identification codes being assigned as follows:

| MODE | CODE | FIG. 3 |
|------|------|--------|
| S      | 0     | a, j |
| DR-1   | 1001  | b, k |
| DL-1   | 1010  | d, m |
| D-R1L1 | 1011  | f, o |
| D-R2   | 11001 | c, l |
| D-L2   | 11100 | e, n |
| D-R2L1 | 11011 | g, p |
| D-R1L2 | 11110 | h, q |
| D-R2L2 | 11111 | i, r |
| D-B    | 11000 | Not Shown. |

Figure 5:
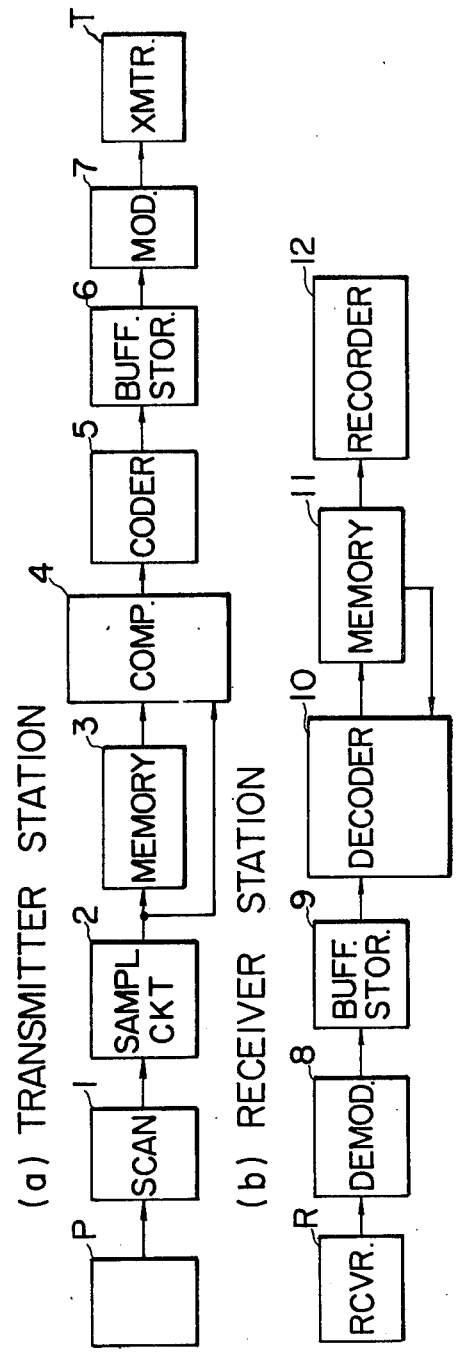
FIG. 5 is a block diagram of a transmitting and receiving system suitable for use with the present invention.

The block diagram of FIG. 5 shows a preferred embodiment of a transmitter station and a receiver station suitable for use with the present invention. The output from a photoelectric scanner 1, derived from the scanning of a picture P, is converted into a binary bit train in a sampling circuit 2. The sampled signal is stored in a memory 3 and simultaneously fed to a comparator 4. The memory 3 retains the data for exactly one scanning line period, whereby the comparator 4 receives the fresh signal from a lower scan line and the delayed signal from an upper scan line at the same time. The comparator output is coded by a coder 5 according to the predetermined difference modes detected in the comparator 4, and the coded data signal is then stored in a buffer memory 6. The memory 6 is successively read out according to the acceptance rate of a modulator 7, which converts the coded data signal into a desired transmission form and delivers it to a transmitter T. Transmission may be by hard line, wireless, etc. At the receiver R, the transmitted signal is fed to a demodulator 8, whose output is stored in a buffer memory 9. A decoder 10 decodes the data signal read out of the buffer memory by comparing it with the bit pattern of the previously decoded upper scan line stored in a memory 11. That is, the decoder constructs or assembles the actual bit pattern for a lower scan line by altering or modifying the previously constructed actual bit pattern for the adjacent upper scan line in accordance with the coded mode signal for the lower line. The decoded facsimile signals read out from the memory 11 are regenerated on a recording medium to provide the final output picture in a recorder 12. First line startup, at which time no previously scanned lines have been entered into the system for comparison purposes, poses no problem as the initial scan lines in most facsimile transmissions are all white.

What is claimed is:

1. A method of compression coding for binary scanning signals in a facsimile system, comprising the steps of:
   (a) assigning different binary codes to each one of a plurality of predetermined modes of possible, commonly occurring bit pattern variations between the binary bit patterns of adjacent scan lines,
   (b) comparing the binary bit patterns of adjacent scan lines to determine which modes of variation are present in a first scan line with respect to a second, adjacent scan line, and
   (c) assembling the binary codes of the determined modes to thereby constitute a composite compressed code bit sequence representing said first scan line.

2. A method of compression coding as defined in claim 1 wherein one of the assigned codes represents a no bit variation.

3. A method of compression coding as defined in claim 2 wherein the coded modes of bit pattern variations have a maximum variation of 2 bits.

4. A method of compression coding as defined in claim 2 wherein the coded modes of bit pattern variations have a maximum variation of 4 bits.

5. A method of compression coding as defined in claim 2 wherein extreme, uncommonly occurring modes of bit pattern variations are assigned an identification code, and are represented in the composite compressed code bit sequence by said identification code followed by their natural, uncoded bit sequence.

* * * * *